Oct. 16, 1951   E. W. GREENE   2,571,866
CONCENTRATION OF LAND PEBBLE PHOSPHATE
Filed Aug. 20, 1947
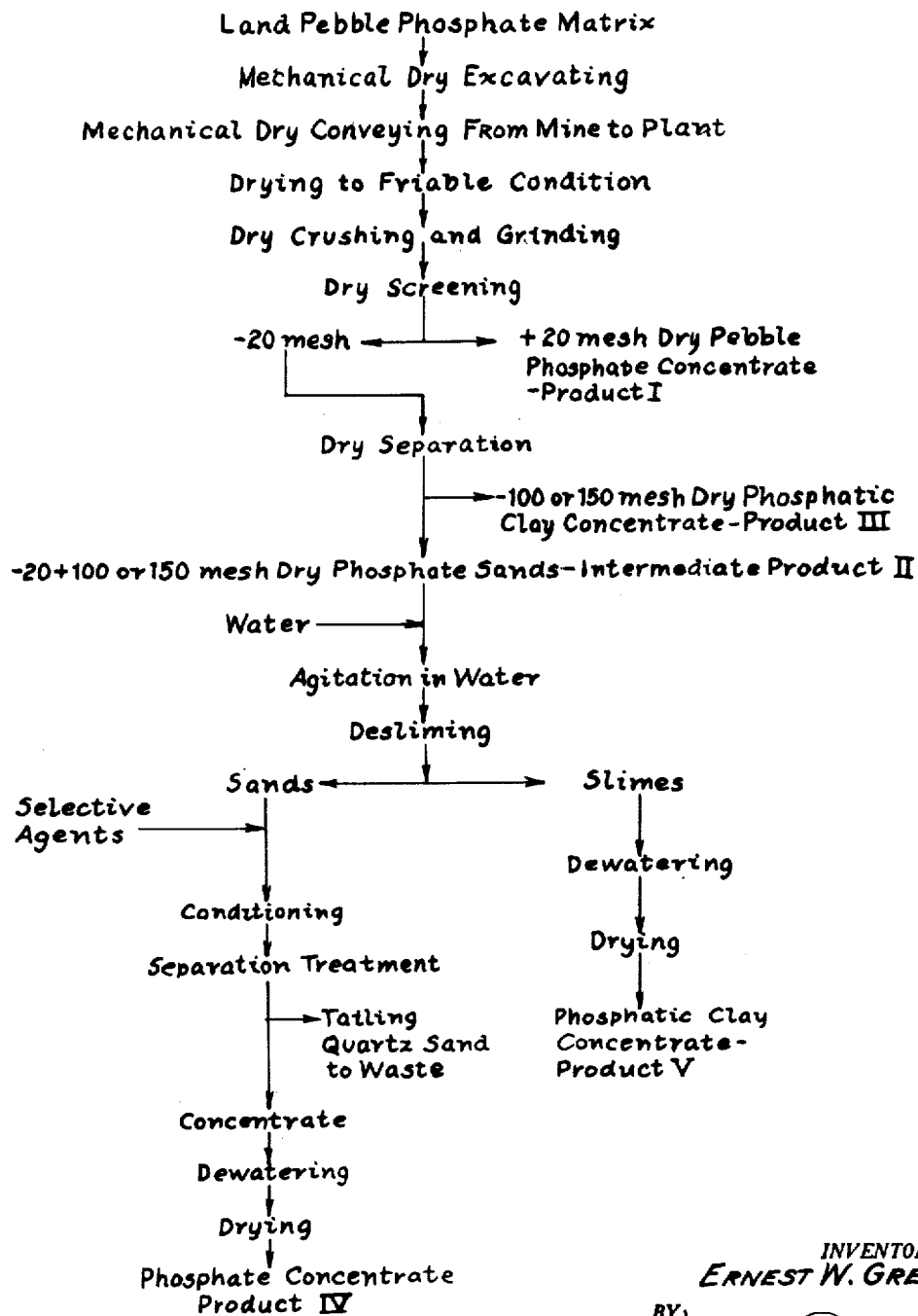
INVENTOR.
ERNEST W. GREENE
BY
ATTORNEYS Patented Oct. 16, 1951

2,571,866

UNITED STATES PATENT OFFICE 2,571,866

CONCENTRATION OF LAND PEBBLE PHOSPHATE

Ernest W. Greene, Lakeland, Fla., assignor to Minerals Separation North American Corporation, New York, N. Y., a corporation of Maryland Application August 20, 1947, Serial No. 769,637

4 Claims. (Cl. 241—14)

This invention relates to methods of concentrating phosphate values from a land pebble phosphate ore of the type commonly found in Florida.

In Florida, what is commonly called "land pebble phosphate" occurs, beneath an overburden of sand and earth, in an ore or "land pebble phosphate matrix" composed of varying proportions of relatively coarse "pebble phosphate," a mixture of phosphate and quartz particles commonly called "phosphate sands," and fine "phosphatic clay" ranging down to colloidal or micron sizes. The pebble phosphate and the phosphate sands are dispersed in the clay which, in its natural wet or damp condition is more or less pliable and sticky and is disintegrated with difficulty. Each of these principal constituents (the pebble phosphate, the phosphate sands and the clay) may contain varying percentages of phosphate values. The pebble phosphate, the phosphate particles in the sands and the phosphatic clay, when suitably concentrated, are useful and saleable.

In the mining of Florida phosphate, after the removal of an overburden strata of sand and earth, usually by large drag lines, the exposed land pebble phosphate matrix is partially disintegrated by hydraulic guns or monitors, whereupon the mixture of matrix and water is pumped to a washing and screening plant. The practices at the washing and screening plants vary in some details, but generally the matrix, which arrives at the plant in large streams of water from the mine pumps, is subjected to a number of wet-scrubbing and water-screening operations to disintegrate the matrix and effect the removal of the pebble phosphate from the wet phosphate sands and clays. The scrubbing and disintegrating equipment used in such plants may include log washers, hammer mills, roll mills, etc.; and the screening equipment is that generally used in wet-screening operations. In addition to the large amounts of water required to pump the phosphate matrix from the mine to the washing and screening plant, further large amounts of water are required in the scrubbing and screening operations. The pebble phosphate gathers on and is removed from the screens as a concentrate which is dried and sold. The water, carrying the phosphate sands and clay, goes through the washer screens and is either sent to waste or is further processed to recover the phosphate values in the phosphate sands.

Usually the pebble phosphate occurs in a land pebble phosphate matrix in sizes coarser than 20-mesh (Tyler) and will analyze from about 55% to about 80% BPL (Bone Phosphate of Lime), depending upon the proportion of such other possible constituents as insoluble, iron and aluminum oxides and calcium carbonate. Usually the phosphate sands which pass through the screens along with the water, consist of a mixture of phosphate and quartz particles ranging in size from about minus 20-mesh to plus 150-mesh or 200-mesh, and will analyze over a wide range of per cent BPL values, depending on the nature of the original phosphate matrix. If the phosphate values in such phosphate sands are sufficient to warrant an economical recovery operation, all of the material which passes through the washer screens is treated to separate the phosphate sands from the clay and water. This is usually done in a series of thickeners, hydroseparators and hydraulic classifiers such as rake classifiers, or screw classifiers. These operations usually require the use of further large amounts of water in order to dilute the colloidal phosphatic slimes and clay sufficiently to allow the phosphate sands to settle out in the apparatus mentioned; and then still further amounts of water are required to wash the settled phosphate sands substantially free of clay or slimes. Such substantial washing and desliming of the phosphate sands is necessary, because the subsequent recovery operations to which the phosphate sands are subjected involve conditioning with agents and treatment by well known flotation, tabling and other procedures, and the presence of the phosphatic clays would be detrimental to these recovery operations. Such recovery operations, which are well known and need not be described here, yield from the phosphate sands a high grade phosphate concentrate and reject a low grade quartz tailing which is set to waste. The phosphatic clay or slimes, carried in suspension in the large volumes of water used in the mining and the washing and screening operations and in the phosphate sands settling and washing operations, are customarily sent to waste. This water, carrying the phosphatic clay or slimes, flows or is pumped to large impounding areas where the clay largely settles out, thus allowing the water to be used over again in the various operations.

The true phosphatic clays in the pebble phosphate matrices are generally composed of very fine colloidal particles, the size of which would be measured in microns. However, for all practical purposes, most of the matrix material finer than minus-150-mesh or 200-mesh must be considered as a waste material in present operations, because this material cannot be economically recovered under present practices. This now-wasted material will be referred to herein as "phosphatic waste." The phosphate waste portion of the matrix will vary considerably in its weight percentage of the total matrix solids, in its per cent BPL grade, and in the percentage of the total matrix phosphate values which it contains. For example, in eleven pebble phosphate matrix samples, obtained from various Florida land pebble phosphate deposits, the phosphatic waste portion varied from 11.7% to 34.9% of the weight of the total matrix solids; and other matrix deposits in which this per cent weight is considerably higher are quite common in Florida. The phosphatic waste in these eleven matrix samples varied in BPL content from 17.1% BPL to 51.1% BPL, and the percentages of the total matrix BPL contained in them varied from 13.4% to 34.5%. Thus it will be seen that the phosphatic waste portion of the matrix represents a considerable proportion of the total BPL content of the matrix; and it will be apparent that failure to recover this phosphatic waste, under present operations, represents a serious loss of the bone phosphate of lime values.

The general object of the present invention is to recover, by simple and economical means, a higher percentage than heretofore of the phosphate values in land pebble phosphate matrices. A particular object of the present invention is to recover most of the phosphatic waste and phosphatic clay or slime portion of the matrix, which, according to present practices, goes to waste. Another important object of the present invention is to recover the phosphate values from the matrix without subjecting the matrix to the expensive scrubbing and water screening operations heretofore employed. Still another object of the invention is the preparation of a furnace feed for the production of elemental phosphorus, phosphorus oxides, or phosphoric acid. Further objects and advantages of the invention will hereinafter appear.

The present invention is the result of my discovery that an original land pebble phosphate matrix, in the wet or damp condition in which it is dug from the naturally occurring strata in the ground, can be dried to form a friable material which can be readily disintegrated, in its substantially dry state, into a mixture of particles varying from pebble size through sand size to very fine dry clay particles. The appearance of such a disintegrated dry lump of matrix led me to believe that it could be dry-sized to produce a coarser phosphate pebble product, a fine phosphate slime product, and an intermediate mixture of phosphate and quartz having particles of sand size from which the phosphate particles can be concentrated.

The method which is the present invention will be understood from the following description, taken in connection with the accompanying drawing which is a conventional flow sheet illustrating the method as it would be carried out in a commercial operation.

In practicing the present invention, the land pebble phosphate matrix strata should be mined or dug by mechanical means, such as drag lines, power-shovels, etc. and should then be mechanically conveyed to the drying operation by conveyor belts, railroad cars, trucks, etc. Hydraulic mining or pumping of the matrix would be a handicap in the practicing of my method and should not be used, because it would involve the use of considerable amounts of water, consequent losses of phosphatic slime, and would make more difficult the drying of the matrix which is the first step in the method about to be described.

In my method the first step in treating the dry-mined land pebble phosphate matrix is to dry the matrix to friable condition. The drying step of my method does not need to be carried out at high temperatures, sun-drying being very satisfactory; and drying can be satisfactorily accomplished in the usual commercial driers. The matrix does not need to be thoroughly dried to an extent which leaves only a few per cent or less of moisture, but merely needs to be dried to an extent which will make the dried matrix friable and which will allow the phosphatic clay to be readily disintegrated from the pebble and sand sized constituents. Satisfactory drying is generally accomplished when the broken matrix lumps present a dry appearance throughout.

The next step of my method is the disintegrating treatment to which the dried land pebble phosphate matrix is subjected. I have found that the drying of the matrix itself produces some disintegration and that the resulting dry lumps of matrix varied to some extent in their friability depending on their clay content. However, the greater portion of the dried matrix can be disintegrated by slight pressure or rubbing action and substantially all of it by moderate pressure or rubbing without substantial comminution of the phosphate pebbles and sands. This disintegrating treatment can be accomplished in many convenient ways, and most commercial types of crushing and grinding equipment can be utilized. As the dried matrix is very friable and easy to disintegrate, the particular type of machine used is not of great importance. I have found that an initial crushing through from about ½ to ⅛ inch openings, followed by moderate grinding or attrition or both, is satisfactory. The selection and operation of grinding equipment can easily be chosen and will depend to some extent on the nature of the products desired.

For example, it may be desired to utilize the greatest possible portion of the BPL content of the matrix as a furnace feed of about 40% to 60% BPL grade, for the production of elemental phosphorous, phosphoric acid, etc., in an electric or other furnace process, or for the production of defluorinated phosphate in a kiln process. In such a case, it would only be necessary to remove a sufficient quantity of quartz from the sand-size portion of the matrix to leave a product of the desired BPL grade. This would require only a partial liberation from the phosphatic clay of either the pebble or the phosphate sands particles, by the crushing and grinding step of the method. I have found that sufficient liberation of the phosphate pebbles and phosphate sand particles, to make the product useful for such furnace feed, can be accomplished in many cases by a crushing operation only, but it is generally preferable also to provide grinding means in order to disintegrate successfully some of the less friable phosphate matrices which may be encountered.

When it is desired to produce a high BPL pebble product for use in acidulation processes in the production of phosphoric acid, etc., the pebble phosphate product should be substantially freed of phosphatic clay and entrained quartz sand particles. I have found that such a clean pebble phosphate product can be produced by proper grinding or attrition of the crushed dry matrix. This can be accomplished, for example, in rod mills or ball mills, without undue crushing of the pebble phosphate, either by operating these mills with high feed loads and short retention times, or by reducing the rod or ball loads, or both. Under such conditions the dry phosphatic clay is readily removed from the surfaces of the phosphate pebbles, and the latter can be recovered in a simple dry-screening operation.

The sizing or classifying step of my method is applied to the dry-crushed and/or dry-ground land pebble phosphate matrix by means of well-known types of dry-screening and dry-sizing apparatus, the selection of which will depend on the products desired, as will be understood by those accustomed to handling crushed and ground materials. In practicing my method, it is preferable to screen out of the crushed or ground phosphate matrix a pebble phosphate concentrate containing all particles larger than approximately 20-mesh, whether this concentrate (in the drawing called Product I) is to be used for acidulation purposes as a clean phosphate pebble, or whether it contains more or less clay and sand-size material and is to be used as a feed to a thermal process. However, due to a variation in the coarsest size of the free quartz sand particles in different matrix deposits in Florida, it may be advantageous to screen out pebble phosphate concentrates on screens as coarse as 10-mesh or as fine as 28-mesh.

The dry land pebble phosphate matrix material which is finer than approximately 20-mesh is then sized into two parts the nature of which will depend on the particle size distribution of the quartz sand constituent, and will also depend on the end use of the products sought. With these considerations in mind, this material may be divided on screens somewhat finer than 20-mesh, or by means of an air separator such as a cyclone separator, into a portion (in the drawing called Intermediate Product II) containing particles which are minus 20-mesh and plus 100-mesh or 150-mesh, and into a portion which is finer than 100-mesh or 150-mesh (in the drawing called Product III).

The finer portion of the dry phosphate matrix material (Product III) thus obtained may be used for fertilizer purposes by direct application to the soil, if it is sufficiently high in BPL content. This finer portion may also be used by itself, or after combination with other products of my method, as feed to electric furnace and other thermal processes. This fine material, which is largely composed of phosphatic clay, would seldom, if ever, be of sufficiently high BPL grade to be useful in acidulation processes.

The intermediate portion of the dry phosphate matrix material, (Product II) which contains the particles which range approximately between the plus 20-mesh pebble size and the fine minus 100 or 150 mesh size, generally will contain an important amount of the quartz sand content of the original matrix and similarly sized particles of phosphate, together with some phosphatic clay which was not completely disintegrated by the crushing and grinding steps above described. As distinguished from the other products of my method, this intermediately sized material (Product II) requires further treatment for the concentration of the phosphate values therein.

Now, for the first time, water may be used advantageously in the practicing of a step of my method. The residual slime or clay part of the intermediate product (Product II) above mentioned can be separated from the sand sized mixture of phosphate and quartz particles by agitating that intermediate product in water and then desliming the mixture in thickeners, hydroseparators, classifiers, etc. arranged to overflow the water containing the phosphatic clay. This phosphatic clay concentrate (referred to in the drawing as Product V) can readily be settled, recovered from the water and dried, because the amount of clay and the volume of the water will be only small fractions of those quantities encountered in the hydraulic operations in phosphate washing and screening plants heretofore used in the concentrating of pebble phosphate.

The substantially deslimed sand-sized mixture of quartz and phosphate particles can then be subjected to the usual wet-separating or concentrating processes involving the use of selective reagents which are well known. For example, separation of either the phosphate particles from the quartz particles or vice versa may be effected by well-known methods after conditioning with well-known reagents, by froth flotation or tabling treatments or by treatments in other well known types of apparatus such as moving belt apparatus, underwater screening apparatus, spiral separators, inclined troughs, etc. These well-known methods of treatment will produce a high grade phosphate concentrate (referred to in the drawing as Product IV) and a quartz tailing which is sent to waste. Thus the phosphate constituent may be floated away from the quartz sand with the use of phosphate collecting reagents of the anionic type such as fatty or resin acids and their soaps, sulfates, sulfonates, etc. along with cooperating reagents such as inert oils, frothers, acids, bases, etc. Or the quartz sand may be floated away from the phosphate constituent with the use of either anionic collectors together with the proper silica activators and phosphate depressor reagents, or with the use of collector reagents of the cationic type such as the well known amine collectors.

It will be obvious that the various phosphate concentrates obtained in the manner which has been described may be put to a wide variation of uses. As hereinbefore described, the various products of my method may be listed as follows:

I. Dry phosphate pebble concentrate, which may be either high-grade clean pebble or lower-grade pebble containing phosphatic clay.
II. An intermediate dry phosphate sands product, which is a mixture of phosphate and quartz particles.
III. A dry phosphatic clay concentrate.
IV. A phosphate sand-size concentrate from II.
V. An additional phosphatic clay concentrate from II.

The flow sheet shown in the drawing, and the foregoing description, make clear how these various products are obtained. The following examples illustrate the advantageous results which may be obtained by the practicing of the method which is the present invention. However, it will be understood that the examples and the flow sheet are illustrative only, and not restrictive, and that the scope of the invention is set forth in the appended claims.

*Example I.*—A land pebble phosphate matrix sample obtained from a prospect hole was dried in a sample drying oven until the matrix lumps appeared to be dry throughout. The dry matrix was then put five times through a jaw crusher, set at a minimum opening of ⅛ inch. The crushed matrix was then dry-screened to produce three products: Product I, sized at +20 mesh; an intermediate Product II sized at −20 +100 mesh; and Product III, sized at −100 mesh. The intermediate (−20 +100 mesh) Product II was soaked in water and then deslimed on a 150-mesh screen, yielding after dewatering and drying a −150 mesh Product V composed largely of phosphatic clay; and a substantially deslimed phosphate sands product (−20 +150 mesh) suitable for feed to a table concentrating apparatus. The results of these operations were as shown in Table 1.

*Table 1*

| Products | Per Cent Wt. | Per Cent BPL | Per Cent BPL Rec. | Per Cent Insol. | Per Cent Insol. Rec. |
|---|---|---|---|---|---|
| Dry Crushed Matrix Feed | 100.0 | 48.9 | 100.0 | 32.6 | 100.0 |
| (I) +20 Mesh Pebble Conc | 49.2 | 54.8 | 55.2 | 24.8 | 37.4 |
| (II) Dry −20 +100 Mesh Phosphate Sands | 38.8 | 42.8 | 34.0 | 41.0 | 48.8 |
| (III) Dry −100 Mesh Clay Conc | 12.0 | 44.1 | 10.8 | 37.3 | 13.8 |
| (V) Slime Conc. from II | 5.8 | 43.5 | 5.2 | 29.9 | 5.3 |
| Deslimed −20 +150 Mesh Phosphate Sands from II | 33.0 | 43.9 | 29.7 | 41.2 | 41.7 |

Agglomerate tabling treatment of the deslimed phosphate sands on a laboratory Wilfley table, after these sands were conditioned for 2 minutes at 70% solids with 0.8 pound of caustic soda, 1.5 pounds tall oil fatty and resin acids, and 7.4 pounds of fuel oil, all per ton of solids in the sands, gave the results listed in Table 2. (Middlings which would recirculate are not included.)

*Table 2*

| Products | Per Cent Wt. | Per Cent BPL | Per Cent BPL Rec. | Per Cent Insol. | Per Cent Insol. Rec. |
|---|---|---|---|---|---|
| Feed (Deslimed Phosphate Sands from II) | 100.0 | 43.9 | 100.0 | 41.2 | 100.0 |
| (IV) Table Phosphate Conc | 55.3 | 74.5 | 93.9 | 6.0 | 8.1 |
| Table Tailings | 44.7 | 6.0 | 6.1 | 84.7 | 91.9 |

The blending or putting together of Products I, III and V from Table 1, with the table concentrate from Table 2, produced a combined product weighing 85.2% of the dry weight of the matrix, analyzing 56.8% BPL and representing 98.2% of the BPL values in the original matrix.

*Example II.*—A different sample of land pebble phosphate matrix, which was made up by mixing together matrix samples from six different prospect holes, was dried, crushed and screened into three sizes in the same manner as described in Example I, except that the crusher was set at a minimum opening of ₇⁄₃₂ inch. The −20 +100 mesh intermediate dry Product II was agitated in water at 50% solids for three minutes and then deslimed to produce an additional slime Product V, and a deslimed phosphate sand for flotation feed. This deslimed feed was conditioned for 2 minutes at 70% solids with 0.6 pound caustic soda, 4.1 pounds fuel oil and 0.8 pound tall oil (per ton of solids), and subjected to froth flotation treatment producing a phosphate flotation concentrate and quartz sand tailing. The results are recorded in Table 3.

*Table 3*

| Products | Per Cent Wt. | Per Cent BPL | Per Cent BPL Rec. | Per Cent Insol. | Per Cent Insol. Rec. |
|---|---|---|---|---|---|
| Dry Matrix Feed | 100.0 | 33.6 | 100.0 | 53.3 | 100.0 |
| (I) +20 Mesh Pebble | 29.1 | 47.2 | 40.8 | 35.1 | 19.2 |
| (II) Dry −20 +100 Mesh Phosphate Sands | 62.3 | 26.8 | 49.7 | 63.1 | 73.7 |
| (III) Dry −100 Mesh Clay | 8.6 | 36.9 | 9.5 | 44.5 | 7.1 |
| (V) Slime Product from II | 7.6 | 45.0 | 10.1 | 30.0 | 4.3 |
| (IV) Flotation Conc. from II | 15.7 | 74.1 | 34.5 | 4.3 | 1.3 |
| Flotation Tailing from II | 39.0 | 4.4 | 5.1 | 93.0 | 68.1 |
| Combined Products I, III, IV and V | 61.0 | 52.4 | 94.9 | 27.8 | 31.9 |

From the results in Examples I and II, it will be seen that combined products having BPL grades close to those required for feeds to thermal processes can be obtained by simply crushing (without further grinding) the friable dried matrix, followed by dry screening and table or flotation recovery of the phosphatic values from the intermediate sand-sized portion. It is also apparent that very high BPL recoveries can be obtained from the original phosphate matrix, especially if the clay or slime values are recovered from the hydraulic desliming operation on the phosphate sands of intermediate Product II.

*Example III.*—A third land pebble phosphate matrix sample from a different area was dried in a sample drying oven until the matrix lumps seemed to be dry throughout. The dry matrix was then put once through a jaw crusher with the jaws set at a minimum opening of ¼ inch. This dry-crushed sample was then grounded in a laboratory rod mill for 1¼ minutes at twice the normal mill charge and half of the normal rod load. The dry ground matrix thus obtained was dry-screened to produce three products: Product I, sized at +20 mesh; intermediate Product II sized at −20 +100 mesh; and Product III sized at −100 mesh. The intermediate (−20 +100 mesh) Product II was agitated in water at 50% solids for 5 minutes and then deslimed on a 150 mesh screen. The −150 mesh phosphatic clay was recovered from the water used for desliming by settling, and after dewatering and drying became Product V. The deslimed phosphate sands were conditioned for 2 minutes at about 70% solids with 0.4 pound caustic soda, 4.0 pounds fuel oil, and 0.5 pound of tall oil (all per ton of solids), and then subjected to froth flotation treatment, thus producing a cleaned phosphate concentrate (Product IV) a middling of lower grade which would be recirculated in a plant operation, and a quartz sand tailing. The results are recorded in Table 4.

Table 4

| Products | Per Cent Wt. | Per Cent BPL | Per Cent BPL Rec. | Per Cent Insol. | Per Cent Insol. Rec. |
|---|---|---|---|---|---|
| Dry Matrix Feed | 100.0 | 40.4 | 100.0 | 47.5 | 100.0 |
| (I) Dry +20 Mesh Pebble | 9.4 | 67.6 | 15.7 | 11.3 | 2.2 |
| (II) Dry −20 +100 Mesh Phosphate Sands | 80.5 | 36.3 | 72.2 | 53.7 | 91.0 |
| (III) Dry −100 Mesh Clay | 10.1 | 48.3 | 12.1 | 31.9 | 6.8 |
| (IV) Flotation Concentrate from II | 24.0 | 73.9 | 43.9 | 7.2 | 3.6 |
| (V) Slime from Product II | 13.0 | 59.2 | 19.0 | 26.8 | 7.3 |
| Flotation Middling from II | 3.4 | 21.3 | 1.8 | 71.9 | 5.1 |
| Flotation Tailing from II | 40.1 | 7.6 | 7.5 | 88.7 | 75.0 |
| *Combined Products* | | | | | |
| I and IV | 33.4 | 72.1 | 59.6 | 8.4 | 5.8 |
| III and V | 23.1 | 54.5 | 31.1 | 29.0 | 14.1 |
| I, III, IV, V and Middlings | 50.9 | 62.4 | 92.5 | 19.9 | 25.0 |

The results show that the proper dry crushing, grinding and screening of dried pebble phosphate matrix will produce a pebble phosphate of sufficient BPL grade for acidulation purposes. The combination of the dry-screened pebble phosphate and the flotation concentrates produced a 72.1% BPL product, representing 59.6% BPL recovery from the matrix. This is practically equivalent to the 73.9% BPL product representing 66.3% BPL recovery which was obtained by the old process of wet washing, screening and flotation on another sample of the same matrix. Example III exhibits the further advantage that a phosphatic clay product of 54.5% BPL, representing an additional 31.1% BPL recovery, was obtained, which could be utilized for other purposes. The versatility of the process of this invention is further illustrated by the last line in Table 4, where an alternative combined product is shown which could be used for feed to a thermal or heat treatment process.

Numerous tests along the lines of the above examples, utilizing many different land pebble phosphate matrices and various crushing and/or grinding procedures, have demonstrated that my process is applicable generally to such matrices, with their natural variations in pebble phosphate, phosphate sands, and clay contents, and BPL grades. These tests have further demonstrated that the drying, dry-crushing, dry-grinding and dry-separating procedures do not need to be closely controlled and readily lend themselves to a practical plant scale of operations with equipment at present available.

In order to avoid unduly lengthening this specification, only examples have been given involving separation by froth-floating or tabling a phosphate concentrate away from the quartz sands of intermediate Product II, and the use of specific reagents; but it will be readily understood by those skilled in the art that similar separations can readily be accomplished with the use of other reagents known to the art, and that the quartz sand particles can be readily separated from the sand-sized phosphate particles of Product II by froth-floating the quartz sand particles with the aid of well-known agents.

What is claimed is:

1. The method of recovering the phosphate values from a dry-mined land pebble phosphate matrix composed of phosphate pebbles, phosphate sands, quartz sands and phosphatic clay, which comprises drying the said phosphate matrix until it presents a dry appearance throughout; subjecting said dried matrix to a mechanical disintegrating dry treatment without substantial comminution of the said pebbles and sands; dry-sizing the ingredients of said disintegrated matrix into a coarser phosphate pebble product, an intermediate phosphate and quartz sands product containing a portion of the coarser phosphatic clay, and a finer phosphatic clay product; subjecting said intermediate phosphate and quartz sands product to agitation in water and washing therefrom a residual phosphatic clay product; conditioning the thus deslimed intermediate phosphate and quartz sands product in an aqueous pulp with selective reagents having an affinity for only one of those constituents; subjecting said conditioned pulp to a wet separating treatment whereby the phosphate and quartz sands are separated from one another, thereby producing a concentrate of phosphate sands and a tailing of quartz sands which is sent to waste; whereby substantially all of the useful phosphate values in said matrix are recovered as pebble phosphate, as phosphatic clay and as phosphate sands.

2. The method of recovering the phosphate values from a dry-mined land pebble phosphate matrix as defined in claim 1, employing anionic agents for the conditioning of said deslimed intermediate phosphate and quartz sands product in an aqueous pulp, and subjecting said conditioned pulp to a flotation treatment whereby the phosphate sands are floated away from the quartz sands.

3. The method according to claim 1 employing a screen of approximately 20-mesh in the dry-sizing of the ingredients of said disintegrated matrix.

4. The method according to claim 3 in which said dry-sizing of the ingredients of said disintegrated matrix is regulated to produce a concentrate of the phosphatic clay which is composed of particles which are approximately −100 mesh.

ERNEST W. GREENE.

REFERENCES CITED

The following references are of record in the file of this patent:

UNITED STATES PATENTS

| Number | Name | Date |
|---|---|---|
| 1,124,442 | Hoover | Jan. 12, 1915 |
| 1,535,120 | Kanowitz | Apr. 28, 1925 |
| 1,761,546 | Trotter | June 3, 1930 |
| 1,810,794 | Shuey | June 16, 1931 |
| 1,901,221 | Bullwinkel | Mar. 14, 1933 |
| 2,164,052 | Bullwinkel | June 27, 1939 |

Certificate of Correction

Patent No. 2,571,866 October 16, 1951

ERNEST W. GREENE

It is hereby certified that error appears in the printed specification of the above numbered patent requiring correction as follows:

Column 2, line 4, for "insoluble" read *insolubles*; line 38, for "set" read *sent*; columns 9 and 10, Table 4, line 6 thereof, strike out "(V) Slime from Product II____| 13.0| 59.2| 19.0| 26.8| 7.3"

and insert same below line 4, same table and column;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*